United States Patent
Xia et al.

(10) Patent No.: US 9,516,495 B2
(45) Date of Patent: Dec. 6, 2016

(54) APPARATUS AND METHODS OF PMIPV6 ROUTE OPTIMIZATION PROTOCOL

(75) Inventors: Qin (Alice) Xia, Nanjing (CN); Behcet Sarikaya, Wylie, TX (US)

(73) Assignee: Futurewei Technologies, Inc., Plano, TX (US)

( * ) Notice: Subject to any disclaimer, the term of this patent is extended or adjusted under 35 U.S.C. 154(b) by 2638 days.

(21) Appl. No.: 12/040,705

(22) Filed: Feb. 29, 2008

(65) Prior Publication Data

US 2009/0073935 A1 Mar. 19, 2009

Related U.S. Application Data

(60) Provisional application No. 60/904,524, filed on Mar. 1, 2007.

(51) Int. Cl.

| | |
|---|---|
| *H04W 8/26* | (2009.01) |
| *H04W 88/18* | (2009.01) |
| *H04W 8/08* | (2009.01) |
| *H04W 40/36* | (2009.01) |
| *H04W 80/04* | (2009.01) |

(Continued)

(52) U.S. Cl.
CPC ............. *H04W 8/26* (2013.01); *H04W 12/04* (2013.01); *H04W 12/06* (2013.01); *H04W 12/08* (2013.01); *H04W 8/082* (2013.01); *H04W 40/36* (2013.01); *H04W 80/04* (2013.01); *H04W 88/182* (2013.01)

(58) Field of Classification Search
None
See application file for complete search history.

(56) References Cited

U.S. PATENT DOCUMENTS

| | | | |
|---|---|---|---|
| 7,228,431 B2 * | 6/2007 | Haddad et al. | 713/182 |
| 7,319,689 B2 * | 1/2008 | Dutta et al. | 370/338 |

(Continued)

FOREIGN PATENT DOCUMENTS

| | | |
|---|---|---|
| CN | 1870819 A | 11/2006 |
| KR | 20050039066 A | 4/2005 |
| WO | WO 2008/104132 A1 | 9/2008 |

OTHER PUBLICATIONS

Written Opinion of the International Searching Authority, International Application No. PCT/CN2008/070394, Applicant: Huawei Technologies Co., Ltd., et al., Jun. 12, 2008, 3 pages.

(Continued)

*Primary Examiner* — Alpus H Hsu
*Assistant Examiner* — Hooman Houshmand
(74) *Attorney, Agent, or Firm* — Slater Matsil, LLP

(57) ABSTRACT

A network component is provided. The network component is configured to receive a handover context from a first access network device. The network component is capable of sending a first proxy binding update message to a second access network device to initiate a proxy care-of test; receiving a care-of keygen token from the second access network device in response to the first proxy binding update. The network component is configured to send a second proxy binding update message in response to the care-of keygen token to the second access network device to initiate a complete proxy binding update exchange. The network component is configured to receive a proxy binding acknowledge (PBA) message from the second access network device to establish a direct route between the network component and the second access network device.

16 Claims, 8 Drawing Sheets

(51) Int. Cl.
*H04W 12/04* (2009.01)
*H04W 12/06* (2009.01)
*H04W 12/08* (2009.01)

(56) References Cited

U.S. PATENT DOCUMENTS

| | | | |
|---|---|---|---|
| 7,420,956 B2* | 9/2008 | Karaoguz et al. | 370/338 |
| 7,499,437 B2* | 3/2009 | Das et al. | 370/338 |
| 7,551,915 B1* | 6/2009 | Manning et al. | 455/411 |
| 7,620,979 B2* | 11/2009 | Hippelainen | 726/11 |
| 7,680,111 B2* | 3/2010 | Lee et al. | 370/392 |
| 7,782,835 B2* | 8/2010 | Gossain et al. | 370/349 |
| 7,793,098 B2* | 9/2010 | Perkins et al. | 713/160 |
| 7,881,468 B2* | 2/2011 | Haddad | 380/247 |
| 7,953,044 B2* | 5/2011 | Xia et al. | 370/331 |
| 8,102,815 B2* | 1/2012 | Krishnan | 370/331 |
| 2004/0236937 A1* | 11/2004 | Perkins et al. | 713/150 |
| 2005/0044362 A1* | 2/2005 | Haddad et al. | 713/170 |
| 2005/0088994 A1* | 4/2005 | Maenpaa et al. | 370/331 |
| 2006/0098575 A1* | 5/2006 | Lee | 370/237 |
| 2007/0113075 A1* | 5/2007 | Jo et al. | 713/158 |
| 2008/0207206 A1* | 8/2008 | Taniuchi et al. | 455/436 |

OTHER PUBLICATIONS

Qin, A., et al., "PMIPv6 Route Optimization Protocol draft-qin-mipshop-pmipro-00.txt," Network Working Group, Internet-Draft, Feb. 25, 2007, pp. 1-24.

\* cited by examiner

| Home Nonce Index 605 | Home Initiate Cookie 610 | Home Keygen Token 620 | Care-of Address 630 | Mobility Options 640 |

600

APPARATUS AND METHODS OF PMIPV6 ROUTE OPTIMIZATION PROTOCOL

CROSS-REFERENCES TO RELATED APPLICATIONS

This application claims benefit of priority to U.S. Provisional Application No. 60/904,524, filed Mar. 1, 2007, commonly assigned, and which is incorporated by reference as if fully set forth.

BACKGROUND OF THE INVENTION

In Mobile IPv6, every packet sent by a correspondent node (CN) to a mobile node (MN) is first routed to a home agent (HA). The HA then tunnels the packet to the current location of the MN. Due to the indirect transmission of the packet between the MN and the CN, the route for transmitting the packet is a non-optimal route. In few situations, the packet can be transmitted directly from the MN to the CN. However, in most of the cases the packets are still routed through the HA between the CN and the MN, instead of a direct transmission between the CN and the MN due to ingress filtering.

Conventionally, a return routability procedure is provided for a route optimization protocol. In the return routability procedure, a MN sends a Home Test Initiate message to a HA. The HA then sends the message to a CN. The CN then replies a Home Test message to the MN. The CN sends the Home Test message to the MN's home address which is received by the HA, which in turn is tunneled to the MN. The MN also sends a Care-of Initiate Test (CoTI) message directly to the CN. The CN then sends a Care-of Test message in response to CoTI message directly to the MN. The return routability procedure is initiated by the MN.

The return routability procedure enables the CN to obtain a reasonable assurance that the MN is in fact addressable at MN's claimed care-of address as well as at MN's home address. The return routability procedure creates a key Kbm which is shared between the MN and the CN. After the return routability procedure, the MN sends a Binding Update (BU) message to instruct the CN to direct the MN's data traffic to the MN's claimed care-of address. The BU message is secured by Kbm. The CN acknowledges the BU message with a Binding Acknowledgement (Back) message and starts sending the packets directly to the MN establishing a direct route.

An enhanced route optimization (E-RO) is an enhanced version of a MIPv6 route optimization. The Enhanced Route Optimization secures a MN's home address against impersonation through an interface identifier that is cryptographically and verifiably bound to the public component of the MN's public/private-key pair. The MN proves the ownership of the home address by providing information that the MN knows the corresponding private key. An initial home address test can validate the home address prefix, and a subsequent home address tests becomes unnecessary. The Enhanced Route Optimization can further allow the MN and the CN to resume a bidirectional communication in parallel with pursuing a care-of address test. The latency of the home address test and care-of address test is therefore eliminated in most situations.

A MIPv6 binding is conceptually a packet redirection from a home address to a care-of address. The home address is the source of the redirection and the care-of address is the destination. The packets to be redirected can be identified based on the home address. A cryptographic ownership is provided to prove the home address. In general, a Cryptographically Generated Address (CGA) provides a strong, cryptographic binding between its interface identifier and the CGA owner's public key. This enhances a cryptographic home address ownership proof without a public-key infrastructure, enabling other nodes to securely and autonomously authenticate the CGA owner as such, assuming the correctness of the CGA's subnet prefix.

In the home test, the MN initiate the home test, using its CGA as the interface identifier in the source address field of a HoTI message. The CN sends a permanent home keygen token included in a HoT message. After handovering and getting a Care-of Address, the MN starts an early binding update exchange with the CN. The MN adds the care-of test init option to the early BU message in order to receive a care-of keygen token from the CN. The MN authenticates the early BU message with the permanent home keygen token. The CN replies with an early Back with the care-of test option which contains the care-of keygen token. In the complete BU/Back exchange, the MN sends a complete BU message to register its care-of address to the CN. The MN authenticates this message with the care-of keygen token. The home test and the care-of test are both initiated by the MN.

Based on the foregoing, apparatus and methods for a route optimization protocol are desired.

BRIEF SUMMARY OF THE INVENTION

Embodiments of the present invention pertain to methods and apparatus for route optimization protocols for Proxy Mobile IPv6. The methods and systems of the present invention use cryptographically generated home addresses, such that no more proxy home test is performed after the initial proxy home test.

An embodiment of the present invention provides a network component. The network component includes a storage medium, a processor, a first interface, and a second interface. The processor is coupled with the storage medium. The first interface is coupled with the processor and associated with a first access network device associated with a mobile node. The second interface is coupled with the processor and a second access network device. The first interface is configured to receive a handover context from the first access network device. The second interface is capable of sending a first proxy binding update (PBU) message to the second access network device to initiate a proxy care-of test; receiving a care-of keygen token from the second access network device in response to the first proxy binding update; sending a second proxy binding update message in response to the care-of keygen token to the second access network device to initiate a complete proxy binding update exchange; and receiving a proxy binding acknowledge (PBA) message from the second access network device to establish a direct route between the network component and the second access network device.

Another embodiment of the present invention provides a network system. The network system includes a network component associated with a first access network device associated with a mobile node and a second access network device through a network. The network component is capable of receiving a handover context from the first access network device; sending a first proxy binding update (PBU) message to the second access network device to initiate a proxy care-of test; receiving a care-of keygen token from the second access network device in response to the first proxy binding update; sending a second proxy binding update message in response to the care-of keygen token to the second access network device to initiate a complete proxy binding update exchange; and receiving a proxy binding acknowledge (PBA) message from the second access network device to establish a direct route between the network component and the second access network device.

Another embodiment of the present invention provides a method for providing a route optimization protocol. The method includes receiving a handover context from a first access network device. A first proxy binding update (PBU) message including at least a portion of the handover context is sent to a second access network device to initiate a proxy care-of test. A care-of keygen token is received from the second access network device in response to the first proxy binding update. A second proxy binding update message is sent in response to the care-of keygen token to the second access network device to initiate a complete proxy binding update exchange. A proxy binding acknowledge (PBA) message is received from the second access network device to establish a route.

BRIEF DESCRIPTION OF THE DRAWINGS

A further understanding of the nature and advantages of the present invention may be realized by reference to the remaining portions of the specification and the drawings wherein like reference numerals are used throughout the several drawings to refer to similar components. In some instances, a sublabel is associated with a reference numeral and follows a hyphen to denote one of multiple similar components. When reference is made to a reference numeral without specification to an existing sublabel, it is intended to refer to all such multiple similar components.

DETAILED DESCRIPTION OF THE INVENTION

The present invention relates to methods and apparatus for route optimization protocol. More particularly, the invention provides methods and apparatus for PMIPv6 route optimization protocol.

In embodiments, if a mobile node enters its Proxy Mobile IPv6 domain, a mobile access gateway (MAG) which runs on an access router (AR) performs the mobility related signaling on behalf of the mobile node (MN). The MAG can determine the timing to desirably optimize a route path between a mobile node and correspondent nodes (CNs) according to policies. The policies may be pre-configured or obtained by the MAG from an AAA infrastructure or policy function infrastructure. The policies can be stationary in user profiles or dynamically created or maintained.

If the MAG determines which correspondent node needs route optimization, the MAG initiates a proxy home test procedure. The CN verifies the accessibility of the home address during the proxy home test procedure. The CN can verify the accessibility of the care-of address during a proxy care-of test procedure. During the proxy care-of test procedure, a proxy care-of test initiate message is piggybacked on a proxy binding update message which is sent by the MAG to register with the CN to generate a direct route between the MAG and the CN.

Figure 1:
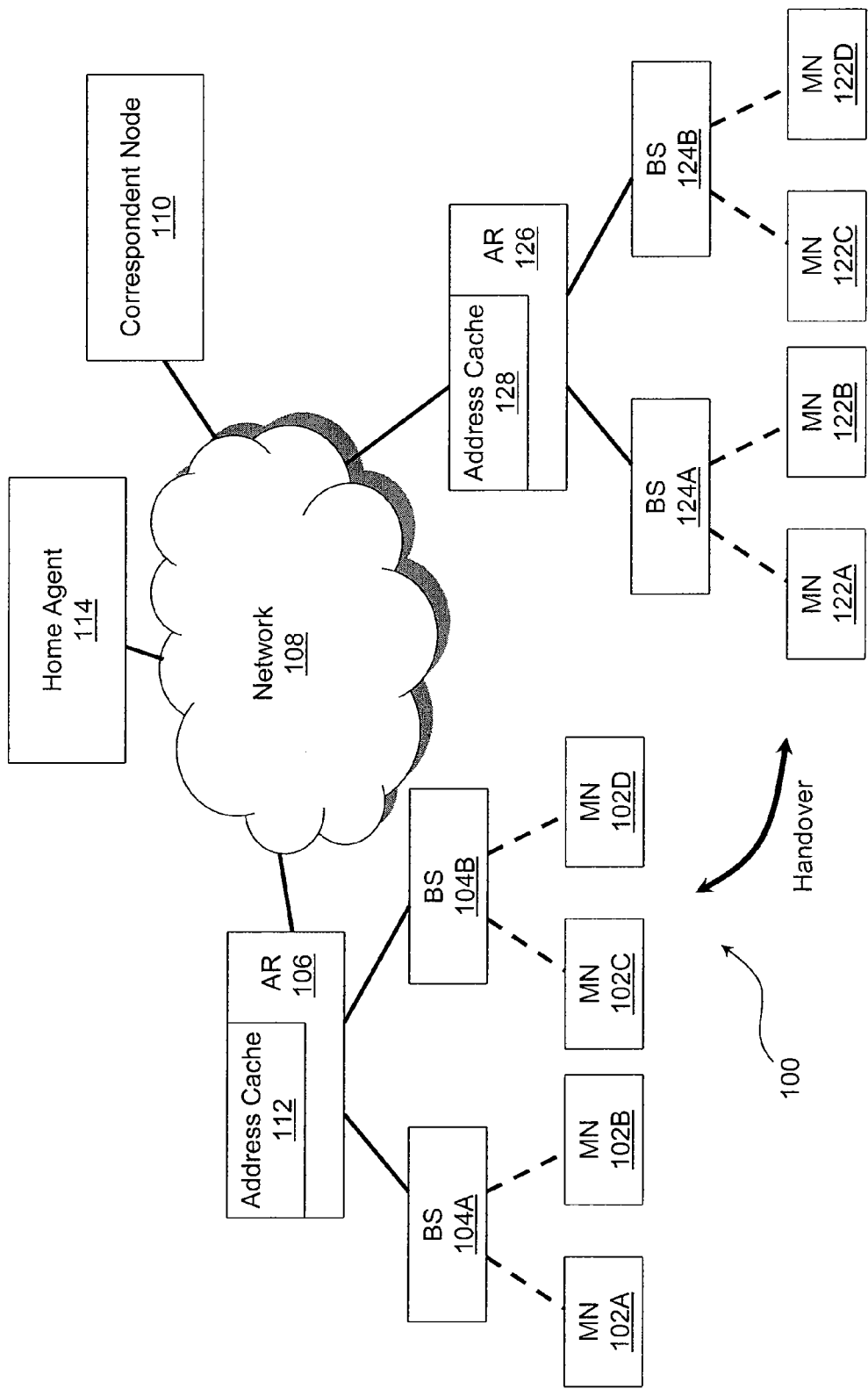
FIG. 1 illustrates an exemplary embodiment of a network system.

FIG. 1 illustrates an exemplary embodiment of a network system. In FIG. 1, system 100 comprises a plurality of mobile nodes (MNs) 102A, 102B, 102C, 102D (collectively, 102), 122A, 122B, 122C, 122D (collectively, 122), a plurality of access network devices such as access points or Base Stations (BSs) 104A, 104B (collectively, 104), 124A, 124B (collectively, 124), network components such as Access Routers (ARs) 106, 126, Network 108, Correspondent Node (CN), Address Caches 112, 128, and a Home Agent (HA) 114. In embodiments, MNs 102, 122 can communicate with BSs 104, 124, respectively, via wireless links. BSs 104, 124, ARs 106, 126, Network 108, and Home Agent 114 can communicate with each other via fixed links. It should be recognized that while FIG. 1 illustrates the system 100 with eight MNs 102, 122, four BSs 104, 124, two ARs 106, 126, and system 100 could accommodate any number of MNs, BSs, and ARs.

In an embodiment, MNs 102, 122 may be any mobile devices, components, or networks that use ARs 106, 126, respectively, to access the Network 108 and/or a third party. MNs 102, 122 can be mobile user-oriented devices that communicate with ARs 106, 126 via the BSs 104, 124, respectively. For example, MNs 102, 122 can be cellular phones, notebook computers, personal digital assistants (PDAs), or any other wireless devices. Alternatively, MNs 102, 122 can be mobile nodes that pass data from Network 108 to an external network, such as wireless routers (not shown).

BSs 104, 124 can be any devices, components, or networks that connect to MNs 102, 122 to ARs 106, 126, respectively. For example, BSs 104, 124 can be fixed devices that are associated with ARs 106, 126 via an Ethernet link and to MNs 102, 122, respectively, via a wireless link. BSs 104, 124 can manage connectivity and transport data between MNs 102, 122 and ARs 106, 126. In embodiments, BSs 104, 124 can relay Neighbor Solicitation (NS) messages from MNs 102, 122 to ARs 106, 126, respectively, and relay Router Advertisement (RA) messages from ARs 106, 126 to MNs 102, 122, respectively. BSs 104 can relay other types of messages between MNs 102, 122 and ARs 106, 126.

ARs 106, 126 can be devices, components, or networks that allow MNs 102, 122 to communicate with Network 108 and/or a third party network. In embodiments, ARs 106, 126 can be first Internet Protocol (IP) routers that MNs 102, 122 encounter, such as Broadband Remote Access Services (BRAS), Media Access Gateways (MAGs), or Access Service Network Gateways (ASN-GW). ARs 106, 126 may be Packet Data Servicing Nodes (PDSN) in a 3GPP2 network, or Gateway GPRS Support Nodes (GGSN) in a 3GPP network. In another embodiment, ARs 106, 126 can be nodes that forward IPv4 and/or IPv6 packets that are not explicitly addressed to ARs 106, 126. ARs 106, 126 can be any fixed point that provides wireless access network coverage to MNs 102, 122, respectively. ARs 106, 126 can communicate with MNs 102, 122 through a fixed link to BSs 104, 124, or may communicate directly with MNs 102, 122 via a wireless link. ARs 106, 126 can also communicate with Network 108 and/or a third party network using a fixed link. In embodiments, ARs 106, 126 can receive a prefix request from one of MNs 102, 126, respectively, that wishes to join the network. ARs 106, 126 can forward the prefixes to MNs 102, 122, respectively.

Network 108 can be any of various types of networks that exchange data between ARs 106, 126, and Home Agent 114. For example, Network 108 can be a Packet Switched Network (PSN), an Intranet, an Internet, a local area network (LAN), a public switched telephone network (PSTN), or any other network. Network 108 can be an Ethernet transport network, a backbone network, an access network, an optical network, a wire-line network, an IEEE 802 network, or a wireless network, such as a cellular network. One of ordinary skill in the art is aware of other embodiments of Network 108.

Correspondent Node (CN) 110 can communicate with MNs 102, 122. CN 110 can be an IPv6 node. In embodiments, CN 110 can be mobile IPv6-capable.

System 100 can include Address Caches 112, 128. Address Caches 112, 128 can be databases, caches, or memory storages containing the IP address information for MNs 102, 122 and any other IP nodes in communication with ARs 106, 126. The address information can include all of the global IP addresses, can be limited to the IP address with a network, or can be limited to the IP addresses associated with ARs, 106, 126. Address Caches 112, 128 can be managed by ARs 106, 126 or a Neighbor Discovery (ND) node. In embodiments, the entries in Address Caches 112, 128 can be maintained using information that passes through ARs 106, 126 or ND node, such as DAD NS or RA messages. An entry in Address Caches 112, 128 can be created when one of MNs 102, 122 is assigned a unique address. An entry in Address Caches 112, 128 can be deleted when MNs 102, 122 are no longer associated with ARs 106, 126, such as when ARs 106, 126 receive a deregistration message from one of MNs 102, 122 or another entity that is authorized to deregister MNs 102, 122. Address Caches 112, 128 can be created and modified by any other methods known to persons of ordinary skill in the art.

Home Agent 114 can be any IPv4 device, IPv6 device, component, or network that may manage at least some of the AR's responsibilities. In embodiments, Home Agent 114 can be a Local Mobility Anchor (LMA) of Proxy Mobile IPv6, a PDSN in a 3GPP network, or a GGSN in a 3GPP2 network. Home Agent 114 can serve as a DHCP client or an AAA client, instead of ARs 106, 126. Home Agent 114 can also contain Address Caches 112, 128. Home Agent 114 can handle IP routing for MNs 102, 122 that may roam into a foreign network. In embodiments, Home Agent 114 can establish a direct connection or indirect connection with ARs 106, 126 through Network 108.

The components described above may communicate with each other via fixed and/or wireless links using a variety of technologies. The wireless links may be created dynamically when one of MNs 102 attaches to AR 106 directly or through BSs 104. Examples of wireless link technologies include Worldwide Interoperability for Microwave Access (Wi-MAX), Wireless Fidelity (WiFi), Code Division Multiple Access (CDMA), Wideband CDMA (WCDMA), Orthogonal Frequency Division Multiple Access (OFDMA), Time Division Multiple Access (TDMA), Global System for Mobile communications (GSM), Enhanced Data for GSM Evolution (EDGE), Universal Mobile Telecommunication SysteMN (UMTS), Third Generation Partnership Project (3GPP), Third Generation Partnership Project 2 (3GPP2), Advanced Mobile Phone Service (AMPS), one of the Institute of Electrical and Electronic Engineers (IEEE) 802 wireless networks such as 802.16d/e, or any other wireless network. The remaining components may be coupled with each other via fixed links, such as electrical or optical links. Examples of fixed link technologies include Ethernet, Asynchronous Transfer Mode (ATM), Synchronous Optical Network (SONNET), and Synchronous Digital Hierarchy (SHE). The fixed and wireless links may have a fixed bandwidth such that a fixed amount of data is transported over the link, or may have a variable-sized bandwidth.

Proxy Mobile IPv6 (PMIPv6) protocol is provided for a network-based IP mobility management support for a mobile node (MN), such that the protocol is substantially free from the participation of the mobile node in any IP mobility related signaling. The mobility entities in the network will track the mobile node's movements and will initiate the mobility signaling and setup the required routing state.

In embodiments for communicating between a Local Mobility Anchor (LMA) and a Mobile Access Gateway (MAG). The LMA is capable of maintaining the MN's accessibility and is the topological anchor point for the MN's home network prefix. The MAG can be the entity that performs the mobility management on behalf of the MN and resides on the access link where the MN is anchored. The MAG can be capable of detecting the MN's movements on its access link and sending binding registrations to the MN's local mobility anchor.

Figure 2:
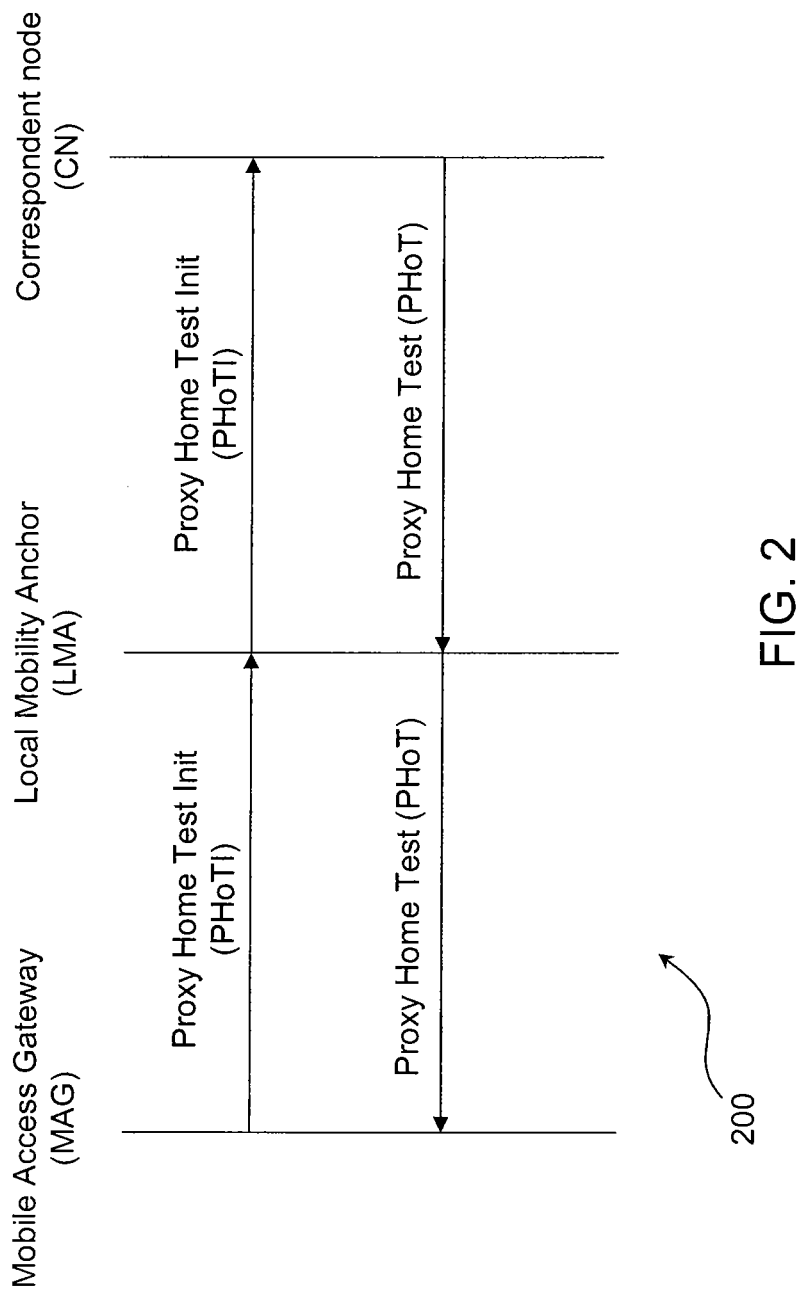
FIG. 2 is a schematic drawing showing an exemplary proxy home test procedure.

FIG. 2 is a schematic drawing showing an exemplary proxy home test procedure. In FIG. 2, proxy home test procedure 200 is provided to validate the home address of a mobile node (MN). In proxy home test procedure 200, a Mobile Access Gateway (MAG) is configured to send a proxy home test initiate message (PhoTI) to a Correspondent Node (CN) via a Local Mobility Anchor (LMA) to initiate a proxy home test. The PhoTI message is sent from the MAG to the CN through a tunnel between the LMA and the CN. After receiving the Photo, the CN sends a proxy home test (PhoT) message to the MAG via the LMA to validate the home address. Since the destination address of PhoT message is the home address of the MN, the MAG can receive and/or process the PhoT instead of forwarding it to the MN. In embodiments, proxy home test procedure 200 can be performed if the change of CNs occurs. Proxy home test procedure 200 can be saved if the access of a CN is switched to another CN.

Figure 3:
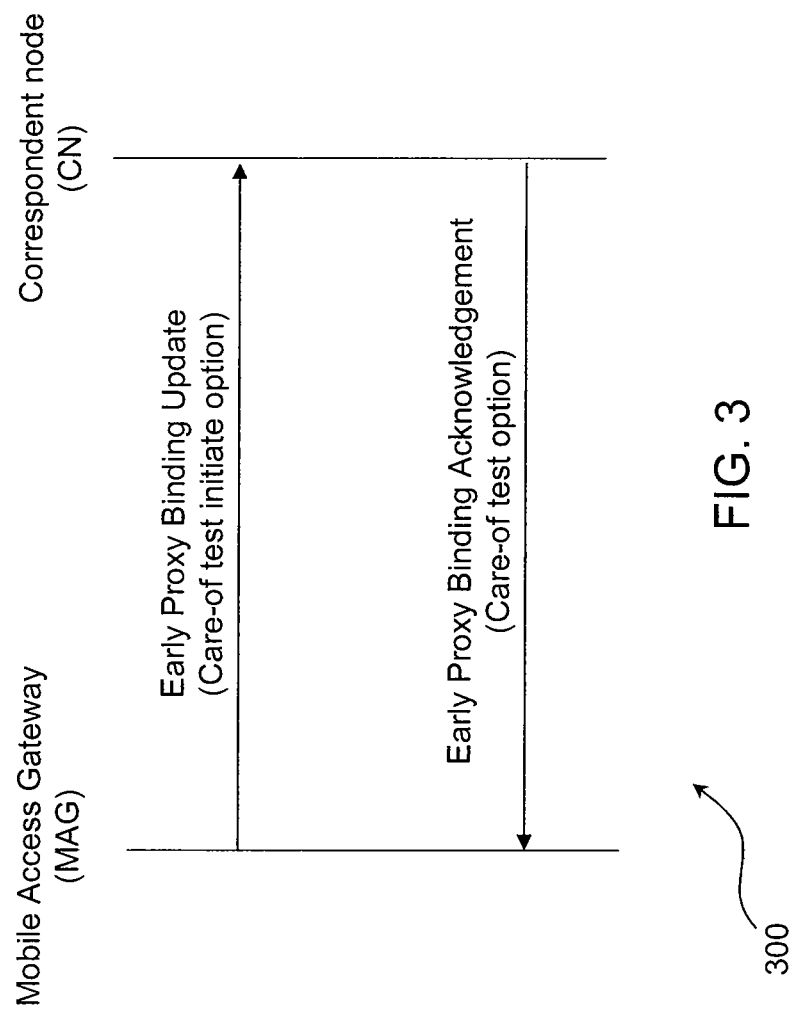
FIG. 3 is a schematic drawing showing an exemplary proxy care-of test.

FIG. 3 is a schematic drawing showing an exemplary proxy care-of test. In embodiments, the CN can be configured to verify the accessibility of the care-of address by care-of test procedure 300. In FIG. 3, the MAG is configured to send an early proxy binding update (PBU) message to the CN to initiate a proxy care-of test. As shown, the proxy care-of test is piggybacked on the early PBU message. The early PBU message can be a PBU which does not carry a care-of keygen token. In embodiments, the early PBU message can include a home address option, a care-of test initiate option, cryptographically generated address (CGA) parameters and/or signature options. The CN can send an early proxy binding acknowledgement (PBA) to the MAG in response to the early PBU message. The early PBA message can include a care-of keygen token in a care-of test option.

Figure 4:
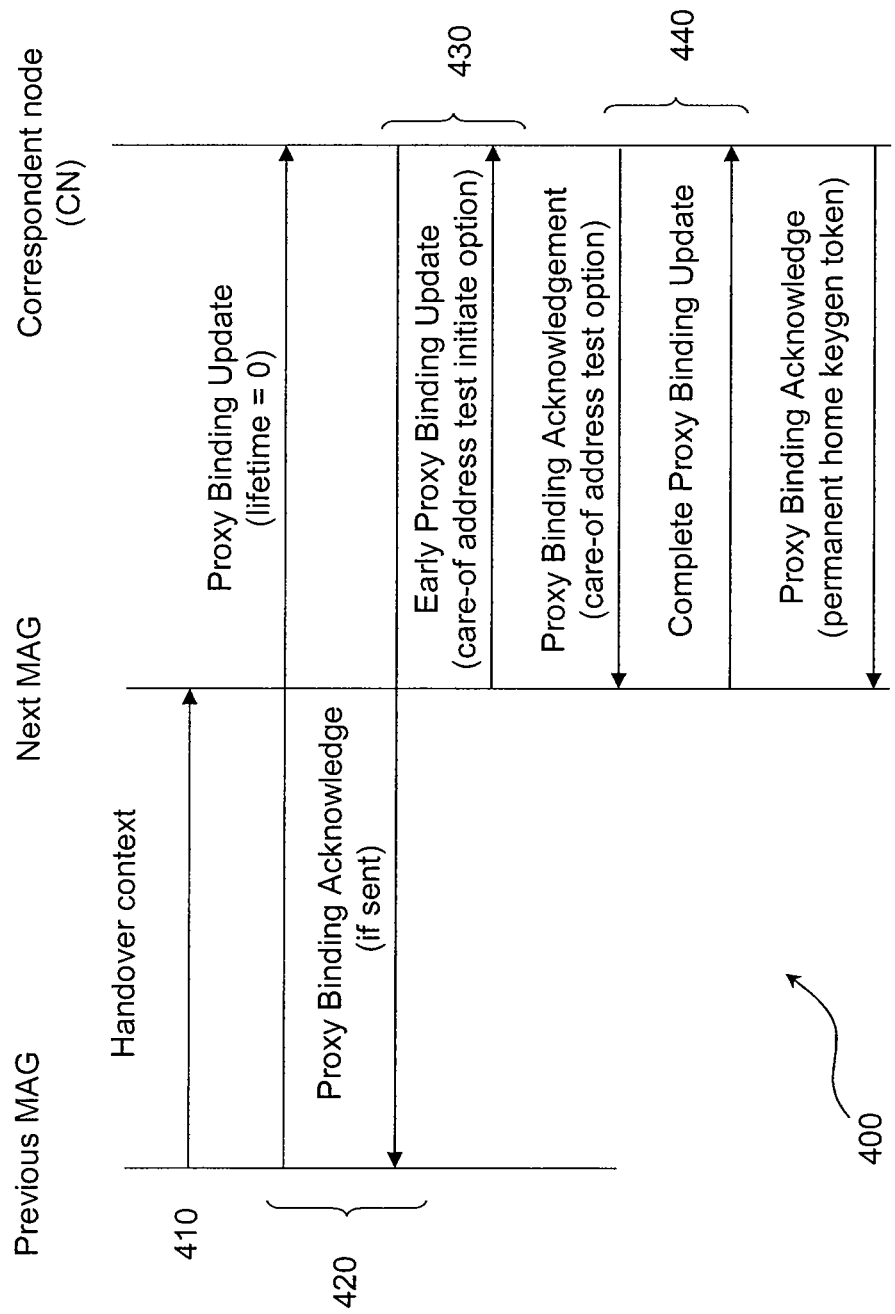
FIG. 4 illustrates a drawing showing an exemplary handover with a route optimization protocol.

FIG. 4 illustrates a drawing showing an exemplary handover with a route optimization protocol. If a handover of the MN from a previous MAG to a next MAG occurs, the proxy care-of address changes. The CN can verify the accessibility of the home address of the mobile node as described above in conjunction with FIG. 2. In FIG. 4, the previous MAG and/or the next MAG can initiate proxy home test procedure 200 (shown in FIG. 2). In embodiments, proxy home test procedure 200 is optional if no change of the CN occurs. A home keygen token, such as a permanent home keygen token, generated after the proxy home test can be used to authenticate an early PBU message which is sent from the next MAG to the CN. After the handover, the home keygen token is transferred from the previous MAG to the next MAG.

In FIG. 4, if the previous MAG can predict a forthcoming handover of the MN via, for example, a layer 2 indication, the previous MAG can transfer a handover context to the next MAG (step 410). In embodiments, the handover context can include a home address of the mobile node, a home network prefix (HNP), addresses of any CNs associated with the MN, a home keygen token and/or CGA parameters of the MN. The CGA parameters can include, for example, MN's private key, hone network prefix (HNP), home keygen token, MN's identifier, interface identifier, and/or link layer address. The CGA parameters can help the next MAG to pass the verification of the home address which is required by the CN.

In embodiments of a reactive handover, the MN is associated with the next MAG before the handover context is sent from the previous MAG to the next MAG. If the next MAG detects the attachment of the MN and the previous MAG is known, the next MAG can request a private key and other parameters from the previous MAG. The previous MAG can obtain the private key during an authentication procedure.

In step 420, after the MN is dissociated with the previous MAG, the previous MAG can deregister the Binding Cache Entry with the CN.

In step 430, after receiving the home keygen token from the previous MAG, the next MAG can initiate care-of test procedure 300 described above in conjunction with FIG. 3. The next MAG sends an early PBU message, which is piggybacked by a care-of test initiate option to the CN as described above in conjunction with FIG. 3. The CN sends the early PBA message including the care-of keygen token in response to the early PBU message to the next MAG.

In FIG. 4, after care-of test procedure 300 (shown in FIG. 3), the next MAG can initiate complete proxy binding update exchange 440. The next MAG can calculate the Binding Authorization Data option field of the complete PBU message based on the care-of keygen token and/or the home keygen token for the CN to verify the accessibility of the care-of address and to authenticate the legitimacy of the next MAG, which sends the complete PBU message on behalf of the MN.

In complete proxy binding update exchange 440, the next MAG is configured to send a complete proxy binding update (PBU) message to the CN to initiate a complete proxy binding update (PBU) exchange. The next MAG can calculate the CGA parameters and/or the signature option according to the MN's home address. The complete PBU message can include the CGA parameters and/or the signature option for the next MAG to request the permanent home keygen token from the CN. The next MAG can add the permanent home keygen token to the binding update list entry for the CN. The CGA parameters provide a desired security bonding between the identifiers of the CGA parameters and the CGA owner's public key. The CGA parameters can desirably allow other CNs to securely authenticate the CGA owner. The security of the complete PBU message can be desirably achieved.

The CN can authenticate the complete PBU message based on the home keygen token generated during proxy home address test procedure 200 (shown in FIG. 2) and the care-of keygen token. In FIG. 4, the CN is capable of validating the proxy binding cache entry generated in response to the early PBU exchange. The CN sends a proxy binding acknowledgement (PBA) to the next MAG.

In embodiments, the next MAG can have a temporary home keygen token instead of a permanent home keygen token sent from the previous MAG. The next MAG is capable of calculating the Binding Authorization Data option field of the complete PBU message with the temporary home keygen token and the care-of keygen token which is set to ZERO. The next MAG can send the complete PBU message including the CGA parameters and/or the signature option to the CN to acquire the permanent home keygen token.

In other embodiments, the next MAG can have the permanent home keygen token. The next MAG can calculate the Binding Authorization Data option field of the complete PBU message with the permanent home keygen token and the care-of keygen token which is set to ZERO. In the embodiment using the permanent home keygen token, the use of the CGA parameters and/or the signature option is optional. If the permanent home keygen token is desired, the permanent home keygen token can be generated and encrypted with the MN's public key. The permanent keygen token can be included within the proxy binding acknowledgement (PBA) message and sent from the CN to the next MAG.

In embodiments, the proxy care-of test procedure (step 430) can be performed concurrently or immediately after the MN moves into the next MAG. The proxy care-of test procedure can be a concurrent proxy care-of test procedure. To desirably avoid the handover latency, the proxy care-of test is piggybacked in the early PBU message. If the handover occurs, the next MAG can calculate the Binding Authorization Data option of the complete PBU message based on the permanent home keygen token. The next MAG and the CN can resume communication, while the care-of address accessibility verification is performed.

After the complete PBU message is received by the CN, the binding cache entry can be verified. The early PBU message includes the CGA parameters and the signature option with the MN's public key and private key to request the care-of keygen token. The CN receives the early PBU message and authenticate the early PBU message based on the home keygen token and the CGA property. If the early PBU message passes the verification, the CN returns the care-of keygen token which is encrypted with the next MAG's public key. The care-of keygen token is encrypted and sent included in a field of the early PBA message. If the next MAG receives the early PBA message, the next MAG sends a complete PBU message to the CN. The Binding Authorization Data option of the complete PBA message is calculated based on the care-of keygen token and the home keygen token. Accordingly, an optimized route between the next MAG and the CN is achieved. By using the CGA parameters, the messages can be securely transmitted between the next MAG and the CN.

Figure 5:
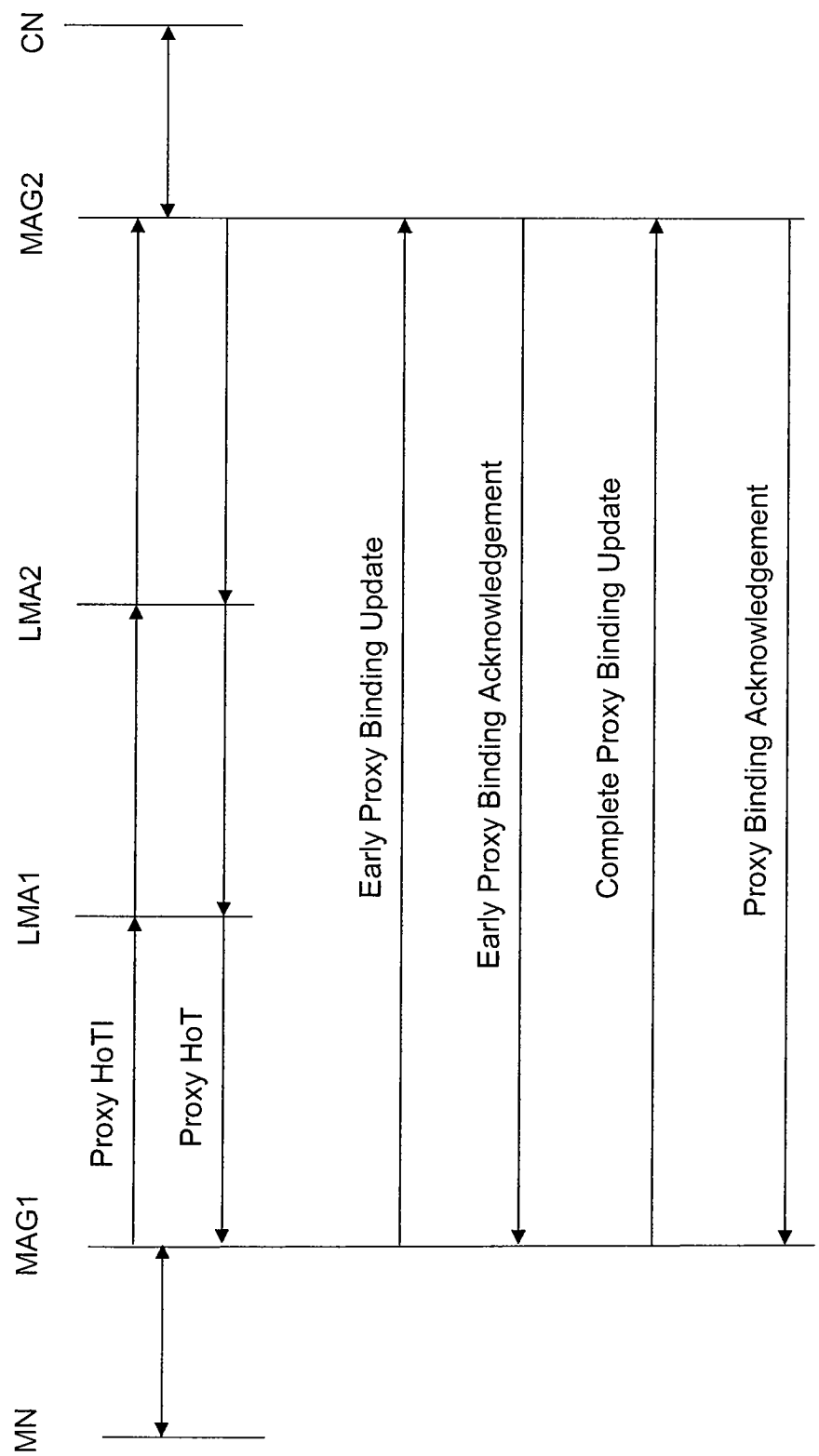
FIG. 5 is a schematic drawing showing an exemplary route optimization signal flow between a MN and a CN associated with different MAGs.

FIG. 5 is a schematic drawing showing an exemplary route optimization signal flow between a MN and a CN associated with different MAGs. In FIG. 5, the MN is associated with a MAG1, which in turn is associated with a LMA1 and the CN is associated with a MAG2, which in turn is associated with a LMA2.

In FIG. 5, the MAG1 and/or MAG2 can provide mobility services for CNs. For example, the MAG1 can receive and/or process the route optimization extensions by checking the MH types and distinguishing Proxy Mobile IP signals from data, such that PMIPv6 Route Optimization protocol can be used for communication of the CNs. As shown in FIG. 5, the MAG1 can send a PhoTI message to the LMA1 through the tunnel between the LMA1 and MAG1. The PhoTI message is sent to the LMA2 from the LMA1 and in turn tunneled to the MAG2.

The MAG2 can receive the PhoTI message and extract the MN's home address and care-of address from the PhoTI message. The MAG2 can add a care-of address of the CN into a PhoT message and send the PhoT message to the MAG1. The MAG2 can generate a Binding Cache entry for the MN. The PhoT message can be tunneled to the LMA2 from the MAG2. The LMA2 then forwards the PhoT message to the LMA1 which in turn is tunneled to the MAG1. After receiving the PhoT message, the MAG1 can extract the care-of address of the CN and add the care-of address of the CN to the Binding Cache entry for the CN. The MAG1 can initiate a care-of test procedure by directly sending an early PBU message to the care-of address of the CN, i.e. to the MAG2. The MAG2 can directly send an early PBA message to the MAG1. The MAG1 can initiate a complete PBU exchange by directly sending a complete PBU message to the MAG2. The MAG2 can directly send a PBA message to the MAG1. Due to the address exchange using the PhoTI and PhoT messages, the proxy care-of test procedure can not be initiated in parallel to a proxy home test procedure. In the embodiment shown in FIG. 5, the optimization route can be generated between the MAG1 and MAG2.

Figure 6:
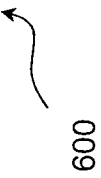
FIG. 6 is a schematic drawing showing an exemplary proxy home test message.

FIG. 6 is a schematic drawing showing an exemplary proxy home test message. Proxy home test message 600 includes home nonce index field 605, home initiate cookie field 610, home keygen token field 620, care-of address field 630, and mobility options field 640. Home keygen token field 620 can include, for example, a 64-bit temporary home keygen token used to authenticate a proximate binding update message. Care-of address field 630 can include, for example, the care-of address assigned to a CN by a MAG.

Figure 7:
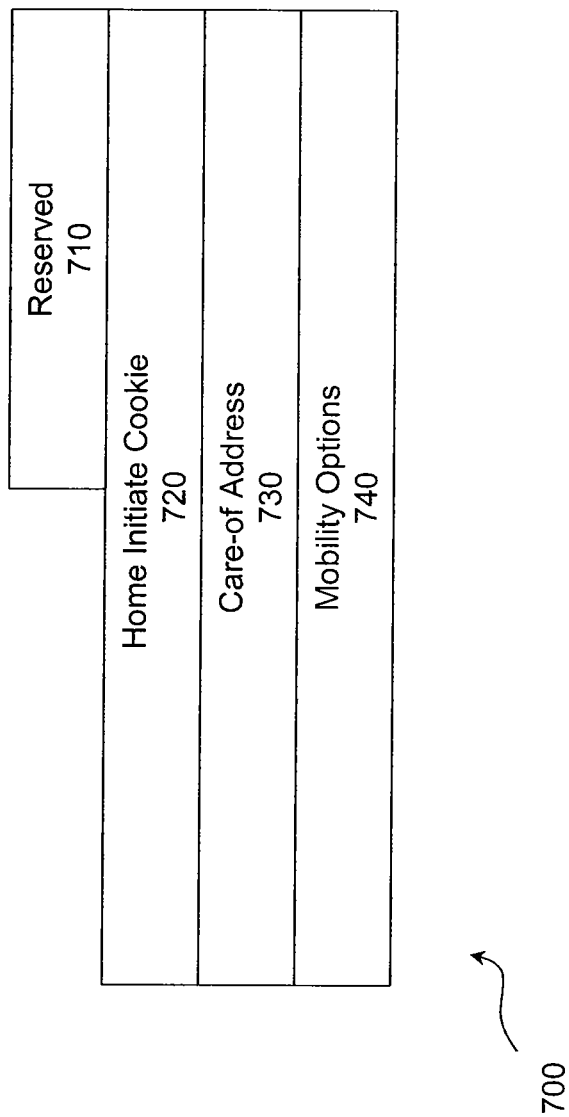
FIG. 7 is a schematic drawing showing an exemplary proxy home test initiate message.

FIG. 7 is a schematic drawing showing an exemplary proxy home test initiate message. Proxy home test initiate message 700 can include reserved field 710, home initiate cookie field 720, care-of address field 730, and mobility options field 740.

Figure 8:
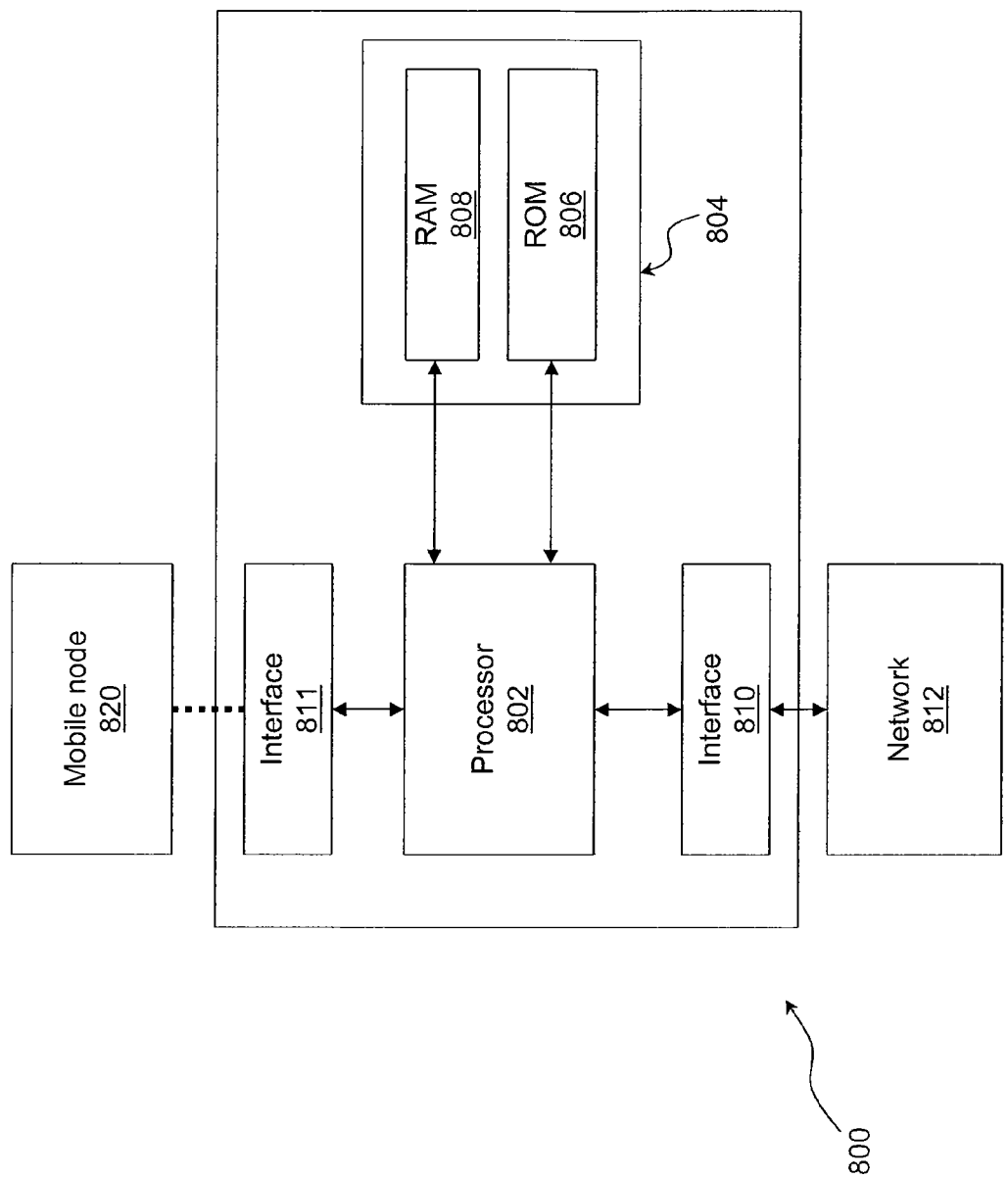
FIG. 8 illustrates an exemplary network component.

FIG. 8 illustrates an exemplary network component. Network component 800 can be, for example, an access router as described above in conjunction with FIG. 1. Network component 800 can include processor 802 (which may be referred to as a central processor unit or CPU) that is in communication with storage medium 804, which can include, for example, read only memory (ROM) 806, and/or random access memory (RAM) 808, and interfaces 810, 811. Network component 800 can be coupled with network 812 and mobile node 820. Processor 802 may be implemented as one or more CPU chips. One of ordinary skill in the art will appreciate that the computer may contain more than one processors, where some of processors may recognize the receipt of and promote the sending of data via the other processors.

Storage medium 804 can include one or more disk drives or tape drives and is used for storage of data. Storage medium 804 may be used to store programs that are loaded into RAM 808 when such programs are selected for execution. ROM 806 is used to store instructions and perhaps data that are read during program execution. ROM 806 is a non-volatile memory device that typically has a small memory capacity relative to the larger memory capacity of secondary storage. RAM 808 is used to store volatile data and perhaps to store instructions. Interfaces 810, 811 can be configured to perform the procedures set forth above in conjunction with FIGS. 2-5.

Where a range of values is provided, it is understood that each intervening value, to the tenth of the unit of the lower limit unless the context clearly dictates otherwise, between the upper and lower limits of that range is also specifically disclosed. Each smaller range between any stated value or intervening value in a stated range and any other stated or intervening value in that stated range is encompassed. The upper and lower limits of these smaller ranges may independently be included or excluded in the range, and each range where either, neither or both limits are included in the smaller ranges is also encompassed within the invention, subject to any specifically excluded limit in the stated range. Where the stated range includes one or both of the limits, ranges excluding either or both of those included limits are also included.

As used herein and in the appended claims, the singular forms "a," "an," and "the" include plural referents unless the context clearly dictates otherwise. Thus, for example, reference to "a method" includes a plurality of such methods and reference to "the precursor" includes reference to one or more precursors and equivalents thereof known to those skilled in the art, and so forth.

Also, the words "comprise," "comprising," "include," "including," and "includes" when used in this specification and in the following claims are intended to specify the presence of stated features, integers, components, or steps, but they do not preclude the presence or addition of one or more other features, integers, components, steps, acts, or groups.

What is claimed is:

1. A network component, comprising:
a storage medium;
a processor coupled with the storage medium;
a first interface coupled with the processor, the first interface being associated with a first access network device associated with a mobile node; and
a second interface coupled with the processor and a second access network device, wherein
the first interface is configured to receive a handover context from the first access network device; and
the second interface is configured to:
transmit, by a mobile access gateway, a first proxy binding update (PBU) message to the second access network device, wherein the mobile access gateway attaches a proxy care-of test initiation request to the PBU message in order to initiate a proxy care-of test on behalf of the mobile node, the proxy care-of test being initiated directly by the mobile access gateway without prompting from the mobile node;
receive, by the mobile access gateway, a care-of keygen token from the second access network device in response to the first proxy binding update;
send, from the mobile access gateway, a second proxy binding update message in response to the care-of keygen token to the second access network device to initiate a complete proxy binding update exchange; and
receive, by the mobile access gateway, a proxy binding acknowledge (PBA) message from the second access network device to establish a direct route between the network component and the second access network device, wherein the processor is configured to calculate a binding authorization data option field of the second PBU message based on the care-of keygen token.

2. The network component of claim 1, wherein the handover context includes at least one of a home address of the mobile node, an address of the second access network device, a home keygen token and cryptographically generated address (CGA) parameters.

3. The network component of claim 2, wherein the home keygen token is a temporary home keygen token, and the processor is configured to calculate a binding authorization data option of the second PBU message based on the temporary keygen token and the care-of keygen token.

4. The network component of claim 1, wherein the first PBU message includes at least one of a home address option, a care-of test initiate option, cryptographically generated address (CGA) parameters, and a signature option.

5. The network component of claim 1, wherein the second interface is further configured to send a proxy home test initiate message to the second access network device to validate a home address of the mobile node, and to receive a proxy home test message in response to the proxy home test initiate.

6. The network component of claim 1, wherein the PBA message includes a permanent home keygen token which is added to a binding update list entry for the second access network device.

7. The network component of claim 6, wherein the second PBU message includes cryptographically generated address (CGA) and a signature option provided for requesting the permanent home keygen token from the second access network device.

8. A network component, comprising:
a storage medium;
a processor coupled with the storage medium;
a first interface coupled with the processor, the first interface being associated with a first access network device associated with a mobile node; and
a second interface coupled with the processor and a second access network device, wherein
the first interface is configured to receive a handover context from the first access network device; and
the second interface is configured to:
transmit, by a mobile access gateway, a first proxy binding update (PBU) message to the second access network device, wherein the mobile access gateway attaches a proxy care-of test initiation request to the PBU message in order to initiate a proxy care-of test on behalf of the mobile node, the proxy care-of test being initiated directly by the mobile access gateway without prompting from the mobile node;
receive, by the mobile access gateway, a care-of keygen token from the second access network device in response to the first proxy binding update;
send, from the mobile access gateway, a second proxy binding update message in response to the care-of keygen token to the second access network device to initiate a complete proxy binding update exchange; and
receive, by the mobile access gateway, a proxy binding acknowledge (PBA) message from the second access network device to establish a direct route between the network component and the second access network device, wherein the handover context includes at least one of a home address of the mobile node, an address of the second access network device, a home keygen token and cryptographically generated address (CGA) parameters, and wherein the CGA parameters are generated based on the home address of the mobile node.

9. A network system, comprising:
a network component associated with a first access network device associated with a mobile node and a second access network device through a network, wherein the network component is configured to
receive a handover context from the first access network device;
send, from a mobile access gateway, a first proxy binding update (PBU) message to the second access network device, wherein the mobile access gateway attaches a proxy care-of test initiation request to the PBU message in order to initiate a proxy care-of test on behalf of the mobile node, the proxy care-of test being initiated directly by the mobile access gateway without prompting from the mobile node;
receive, by the mobile access gateway, a care-of keygen token from the second access network device in response to the first proxy binding update;
send, from the mobile access gateway, a second proxy binding update message in response to the care-of keygen token to the second access network device to initiate a complete proxy binding update exchange;
receive, by the mobile access gateway, a proxy binding acknowledge (PBA) message from the second access network device to establish a direct route between the network component and the second access network device; and
calculate a binding authorization data option field of the second PBU message based on the care-of keygen token.

10. The network system of claim 9, wherein the handover context includes at least one of a home address of the mobile node, an address of the second access network device, a home keygen token and cryptographically generated address (CGA) parameters.

11. The network system of claim 10, wherein the CGA parameters are generated based on the home address of the mobile node.

12. The network system of claim 10, wherein the home keygen token is a temporary home keygen token, and the network component is configured to calculate a binding authorization data option of the second PBU message based on the temporary keygen token and the care-of keygen token.

13. The network system of claim 9, wherein the first PBU message includes at least one of a home address option, a care-of test initiate option, cryptographically generated address (CGA) parameters, and a signature option.

14. The network system of claim 9, wherein the network component is further configured to send a proxy home test initiate message to the second access network device to validate a home address of the mobile node, and to receive a proxy home test message in response to the proxy home test initiate.

15. The network system of claim 9, wherein the PBA message includes a permanent home keygen token which is added to a binding update list entry for the second access network device.

16. The network system of claim 15, wherein the second PBU message includes cryptographically generated address (CGA) parameters and a signature option provided for requesting the permanent home keygen token from the second access network device.

* * * * *